Dec. 6, 1966   J. W. EDGERTON   3,289,418
SUB SOIL IRRIGATING MEANS
Filed Feb. 28, 1964
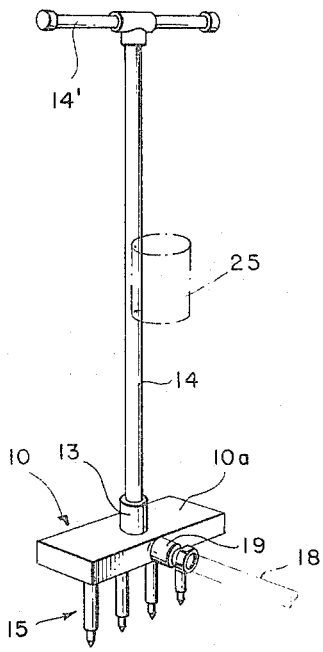
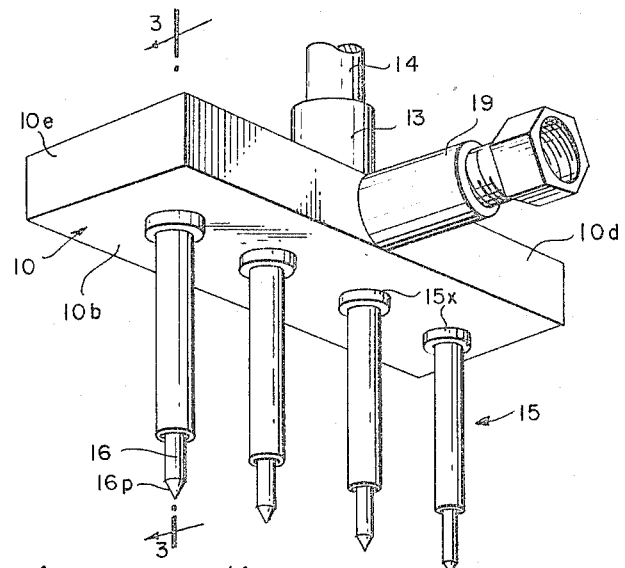
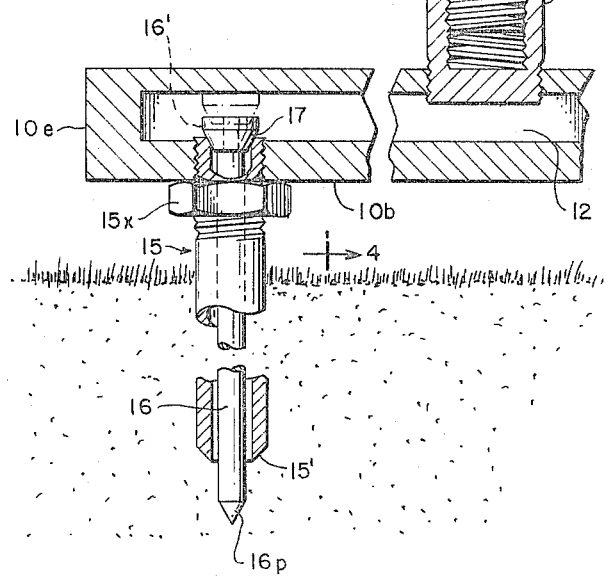
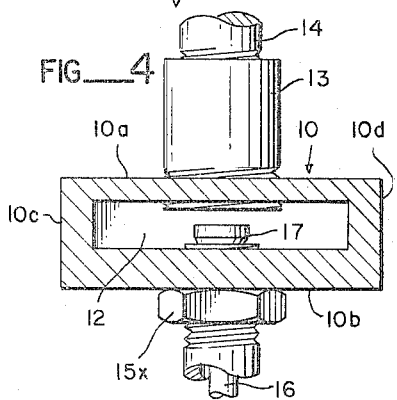
JOHN W. EDGERTON
INVENTOR.
BY *Seed & Berry*
ATTORNEYS

United States Patent Office 3,289,418
Patented Dec. 6, 1966

3,289,418
SUB SOIL IRRIGATING MEANS
John W. Edgerton, 3841 34th W., Seattle, Wash.
Filed Feb. 28, 1964, Ser. No. 348,231
3 Claims. (Cl. 61—13)

This invention relates to soil conditioning, irrigating and fertilizing means; more particularly, it relates to means whereby water, as supplied under pressure through a hose, or the like, may be forcibly discharged through a series of ground piercing nozzles, into the soil for sub-soil softening, irrigating and fertilizing purposes.

It is the principal object of the invention to provide a device of the above stated character embodying a chambered manifold that is equipped to receive water under pressure from a garden hose or the like, for the discharge of said water therefrom through a plurality of nozzles that may be pressed downwardly into the soil by the application of force downwardly on the manifold; said nozzles being equipped with individual means that automatically open with the pressing of the nozzles into the soil, and automatically close with the withdrawal of the nozzles from the ground; each nozzle operating independently of the others.

It is a further object of the invention to provide a device as above stated, wherein each nozzle comprises a tubular body containing a valve stem of spike-like character and of lesser diameter than the tube passage, that projects beyond the end of the tubular body to facilitate the easier projecting of the nozzle into the ground, and which stem mounts a valve head at its inner end for the automatic control of the flow of water from that nozzle.

Yet another object of the invention resides in the provision of a device of the character above disclosed that lends itself to the application of liquid fertilizer to the soil.

Further objects and advantages of the invention reside in the details of construction and combination of parts embodied therein and in its mode of use, as will hereinafter be described.

In accomplishing the above mentioned and other objects of the invention, I have provided the improved details of construction the preferred forms of which are illustrated in the accompanying drawings, wherein:

FIG. 1 is a perspective view of the device of this invention as presently constructed.

FIGURE 2 is an enlarged, under-side perspective view of the chambered manifold and the nozzles as applied to the manifold.

FIG. 3 is a longitudinal sectional view of a part of the manifold, as equipped with a handle mounting socket and with one of the nozzles presently used therewith.

FIG. 4 is a cross-section taken on line 4—4 in FIG. 3.

Referring more in detail to the drawings:

In its present preferred form, the device of this invention comprises a hollow housing or manifold 10 of rectangular form, having parallel top and bottom walls 10a and 10b, opposite side walls 10c and 10d and opposite end walls 10e; these walls all being so joined as to provide a pressure holding manifold 10 with an enclosed pressure chamber 12 extending substantially to its full length.

This manifold 10 preferably is cast of metal or other suitable material and its top wall 10a has a threaded socket 13 fixed centrally therein, in a vertical position, as in FIG. 3. This socket has a length of pipe or rod 13 threaded thereinto mounting a handle 14 at its outer or top end whereby the manifold may be held in proper relationship with the ground in the application of the nozzle into the soil.

Threaded into the bottom wall 10b of the housing 10 in spaced relationship and preferably in alignment therealong, are a plurality of downwardly directed nozzles 15, each of which comprises an open tubular body that is threaded into the bottom wall 10b and opens at its top end into direct communication with the manifold chamber 12 where it is secured by a lock nut 15x. Each tube is slightly conically tapered at its lower end as at 15' in FIG. 3.

Loosely contained in each tube, coaxially thereof, is a spike-like stem 16, somewhat longer than the tube as seen in FIG. 3, each stem having a pointed lower end portion 16p and equipped at its top end with a diametrically reduced portion 16' over which a valve 17 is fitted; said valve being adapted to close over and against a seat at the top end of the tube 15 as a closure therefor.

Water is supplied to the manifold chamber 12 through a hose or pipe 18 which may be threaded at its end into a tubular nipple 19 that is welded to and opens into the chamber 12 through a side wall 10d of the housing.

To use the device for soil treatment and irrigation, it is usually held by means of the handle 14' parallel with the ground surface. Then, by applying downward pressure against the housing 10 or handle 14', the pointed stems 16 of all nozzles 15 are projected into the soil. This projection incidentally moves the stems inwardly in their respective tubes 15 and unseats the valves 17 from their top ends, thus allowing water from the manifold chamber 12 to be forcibly discharged through the tubes 15 to and about the lower ends of the spikes to wet and soften the soil about each nozzle. In this operation, the top ends of the spikes, as equipped with valves 7, engage against the top wall of the chamber 12, as in FIG. 2, or against any other movement arrestor means and any additional downward pressure applied by the operator against the manifold forces the spikes and tubular nozzles farther into the soil, to the limit permitted by the manifold.

When the device is lifted from the ground, the spikes 16 and tubes 15 are withdrawn from the soil and the valves 17 automatically become seated, to stop further outflow of water from the nozzles. Thus, the opening and closing of the valves is automatically in accordance with the application of the nozzles to or withdrawal from the soil.

It is not my intent to limit the number of nozzles to any specific number or to limit their size or length so long as consistent with satisfactory use. Nor is it desired to restrict the manifold 10 to the particular form shown, since it would be practical to employ a tubular manifold instead of rectangular closed at its ends and equipped at any convenient point, end or side, with a nipple for making a hose connection therewith and with any suitable handle mounting means.

Note that the length of each spike-like valve stem 16 is sufficiently greater than the length of the tube 15 containing it that when the valves are fully opened, the ends of the stems still project substantially beyond the tube ends. They allow free outflow of water and no clogging of the annular space between the spikes and tubes is permitted.

It is also advantageous to apply containers of either liquor or solvent fertilizer to the stem 14 as indicated at 15 in FIG. 1 and cause it to enter into the manifold 10 for distribution with the outflowing water. The entrance of the fertilizer to the water may be made in various ways either at the hose connection 19 or into the nozzle tubes 15.

I claim:
1. A sub-soil irrigating device comprising a horizontal manifold enclosing a water tight chamber therein, a handle fixed to the manifold for its placement and holding of the device in use, means for effecting a water line with the manifold chamber, a plurality of water injecting nozzles mounted by and directed downwardly from the manifold; each of said nozzles comprising a tubular body that is mounted by the manifold and is open at its upper end to said chamber and open at its lower end, a valve stem extending through and contained in the tubular body with clearance for water discharge between them and extended at its ends from upper and lower ends of said tubular body, a valve head mounted on the upper end of said valve stem to close against and normally be held seated against the tubular body upper end by water confined under pressure in the chamber; each of said stems extending beyond the lower end of its respective tubular body a sufficient distance so as to protrude beyond the tubular body lower end when actuated upwardly by pressure of its lower end against and into the soil thus to facilitate ground piercing by the tubular body; and each of said stems loosely fitting in its respective tubular body such that insertion of said nozzle tubular bodies into the soil will effect the lifting of each valve head independently of one another for discharge of water from the manifold and nozzle tubular bodies against and into the soil.

2. An irrigating device according to claim 1 wherein each valve stem is pointed at its lower end and limited in its lift by abutment of the valve head against the top wall of the manifold chamber while its pointed end is still extended from the lower end of the tubular body of the nozzle.

3. The device of claim 1 wherein the tubular bodies of the several nozzles are formed with valve seats at their upper ends to seat their respective valve heads, and are conically tapered at their lower ends to facilitate ground piercing.

References Cited by the Examiner
UNITED STATES PATENTS

| | | | |
|---|---|---|---|
| 919,017 | 4/1909 | Jackson | 111—7.3 |
| 1,861,254 | 5/1932 | Arens | 111—7.3 |
| 1,965,177 | 7/1934 | Finkl | 111—7.1 X |
| 2,850,992 | 9/1958 | Hooper et al. | 47—48.5 X |
| 3,077,166 | 2/1963 | Delp | 47—48.5 X |
| 3,091,197 | 5/1963 | Henry | 111—7.1 |

FOREIGN PATENTS 4,673   11/1905   Australia.

CHARLES E. O'CONNELL, *Primary Examiner.*
EARL J. WITMER, *Examiner.*